(12) United States Patent
Weber et al.

(10) Patent No.: US 6,591,860 B1
(45) Date of Patent: Jul. 15, 2003

(54) INFINITELY ADJUSTABLE, LOW DEADBAND, POINT CONTACT PNEUMATIC LEVEL SWITCH

(75) Inventors: Mark Anthony Weber, Norco, LA (US); Curtis Wayne Spears, Jr., Loranger, LA (US); Alvin Joseph Egle, Jr., Luling, LA (US); Curt Joseph Hymel, Norco, LA (US)

(73) Assignee: Shell Oil Company, Houston, TX (US)

( * ) Notice: Subject to any disclaimer, the term of this patent is extended or adjusted under 35 U.S.C. 154(b) by 120 days.

(21) Appl. No.: 09/716,135

(22) Filed: Nov. 17, 2000

(51) Int. Cl.[7] .................................. F16K 31/18
(52) U.S. Cl. ....................................... 137/412
(58) Field of Search ................. 137/412, 413, 137/414

(56) References Cited

U.S. PATENT DOCUMENTS

| | | | | |
|---|---|---|---|---|
| 2,695,030 A | * | 11/1954 | Rice | 137/412 |
| 3,605,782 A | * | 9/1971 | Hollis et al. | 137/412 |
| 3,840,044 A | * | 10/1974 | Harris et al. | 137/413 |
| 4,436,109 A | * | 3/1984 | Taylor | 137/413 |
| 4,542,765 A | * | 9/1985 | Glasgow et al. | 137/414 |
| 4,543,973 A | * | 10/1985 | Ho | 137/413 |
| 4,700,738 A | * | 10/1987 | Frese et al. | 137/412 |
| 5,191,912 A | * | 3/1993 | McDaniel | 137/413 |

* cited by examiner

Primary Examiner—Gerald A. Michalsky

(57) ABSTRACT

A zero to 100% continuously adjustable, low deadband, point contact pneumatic level switch is used in conjunction with an electronic controller, a pneumatic-to-current converter and a current-to-pneumatic converter to control brine level in a gravity-fed batch process. The apparatus includes a flapper disc assembly that is free to rotate or spin in place as the mechanism tracks the level of the fluid and a nozzle to seal, expel and transmit a pneumatic signal for measurement or control of fluid level. The flapper disk/nozzle assembly does not come in contact with the controlled fluid.

6 Claims, 2 Drawing Sheets

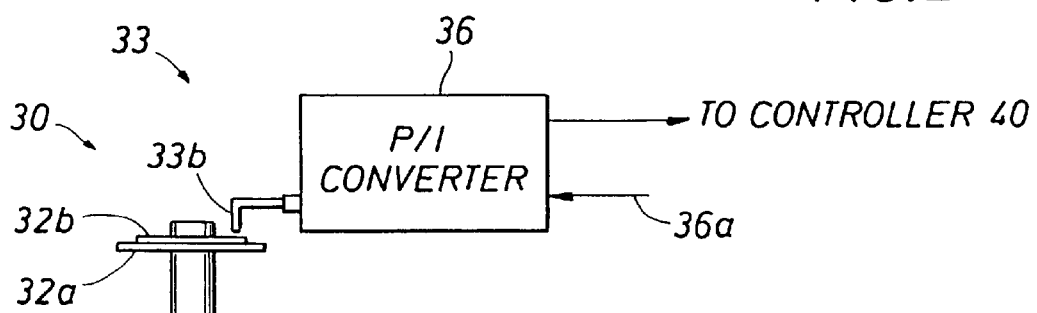
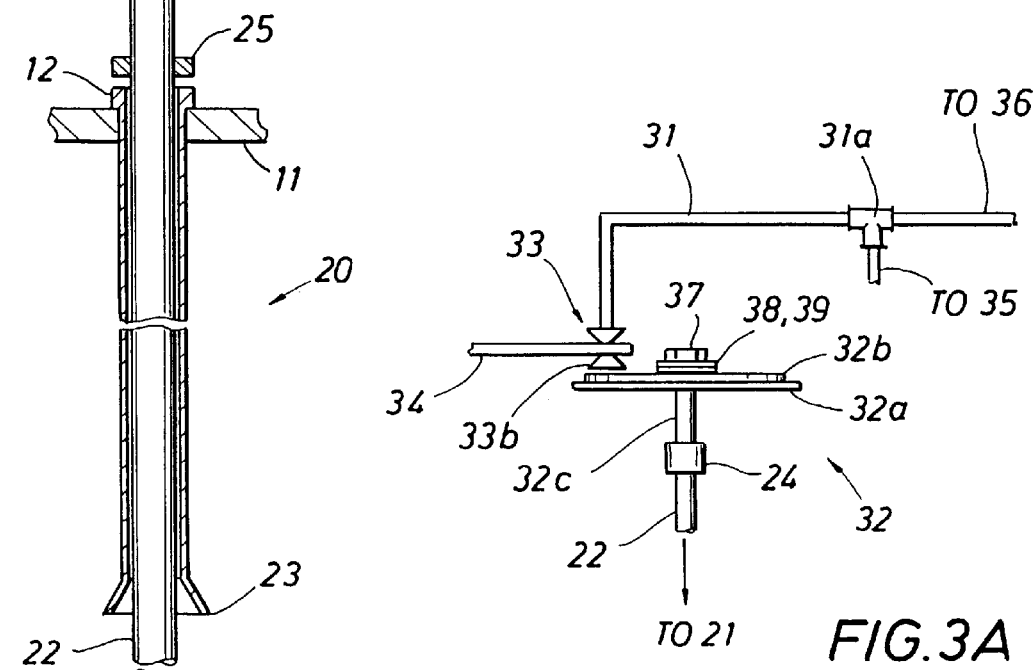
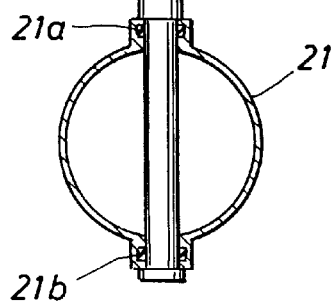
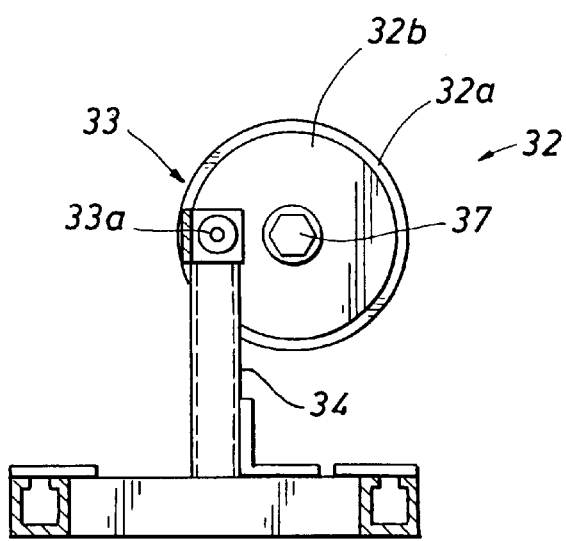
FIG. 2
FIG. 3A
FIG. 3B

INFINITELY ADJUSTABLE, LOW DEADBAND, POINT CONTACT PNEUMATIC LEVEL SWITCH

BACKGROUND OF THE INVENTION

1. Field of the Invention

The invention is related to methods and apparatus for controlling the fluid level in an open pit, particularly for use in controlling the brine level in a gravity-fed batch process used in water treatment plants.

2. Description of Related Art

Devices, which have previously been used for controlling the fluid level in a pit, or sump, include bubbler tubes or "bubblers". In a bubbler, instrument air is used to purge the measuring tube whereby the air forms bubbles that rise through the measured fluid. The head pressure is proportional to the height of the fluid level. In this system, the tube becomes bridged with solids (salts) to such an extent that it will no longer bubble and, therefore, requires shutting down the system for maintenance. Failure of the bubbler (or any other level control system) in a brine pit leads to a lack of brine for regeneration and to eventual pump failure. One prior art level transmitter used a bubbler tube that was constantly plugging due to salt buildup at the end where the tube contacted the process. The bubbler system was redesigned to utilize an electronic transmitter with a 2-inch diameter bubbler tube having multi-ported piping. Having multiple ports helped the fluid to exit the piping section even when one port plugged up. However, many ports became plugged and this design also failed. A Programmable Logic Controller (PLC) was used to backflush the bubbler tube with air solenoids, however, the bubbler tube input continued to plug with crystallized salt despite the use of both instrument air and water purges.

SUMMARY OF THE INVENTION

The present invention is a 0–100% continuously adjustable, low deadband, point contact pneumatic level switch for use in controlling the fluid level in a pit, particularly in a brine pit. It is used in conjunction with an electronic controller, a pneumatic-to-current (P/I) converter and a current-to-pneumatic (I/P) converter to control brine level in a gravity-fed batch process. The invention comprises three elements: (1) a float ball system for tracking the fluid level in a sump; (2) a pneumatic level switch which includes a nozzle/flapper assembly for signaling when the fluid level is at a selected level or deviates therefrom; and (3) a regulator for supplying instrument air to the pneumatic level switch and to the P/I converter for use in controlling the fluid level in the pit. The invention eliminates the prior art air purge bubbler problem by employing a float that controls a nozzle/flapper assembly which, in turn, controls the flow of make-up water into the sump. The nozzle/flapper assembly does not contact the brine fluid and therefore does not clog the system. It allows very close tolerance control of the fluid level in an open pit at any point on a scale ranging from 0% (empty) to 100% (full). The level switch has an extremely low deadband of 1/32 inch of the open pit height of seventeen feet. As brine solution is demanded, the pit fluid level drops, at which time the switch sends a signal to a controller to open a water valve to make up a new batch of brine and to reset the fluid level to the 60% set point. When the fluid level reaches the selected set point setting, the switch sends a signal to the controller to close a water valve and shut off water to the sump. The invention also eliminates the level measurement tracking error i.e., failure of an instrument to follow the changes in actual fluid level of an open pit.

BRIEF DESCRIPTION OF THE DRAWINGS

FIG. 2 is a schematic drawing of the float assembly used in the invention.

FIG. 3A is a schematic drawing of the nozzle/flapper switch assembly used in the present invention.

FIG. 3B is a top view of FIG. 3A.

DESCRIPTION OF PREFERRED EMBODIMENTS

Figure 1:
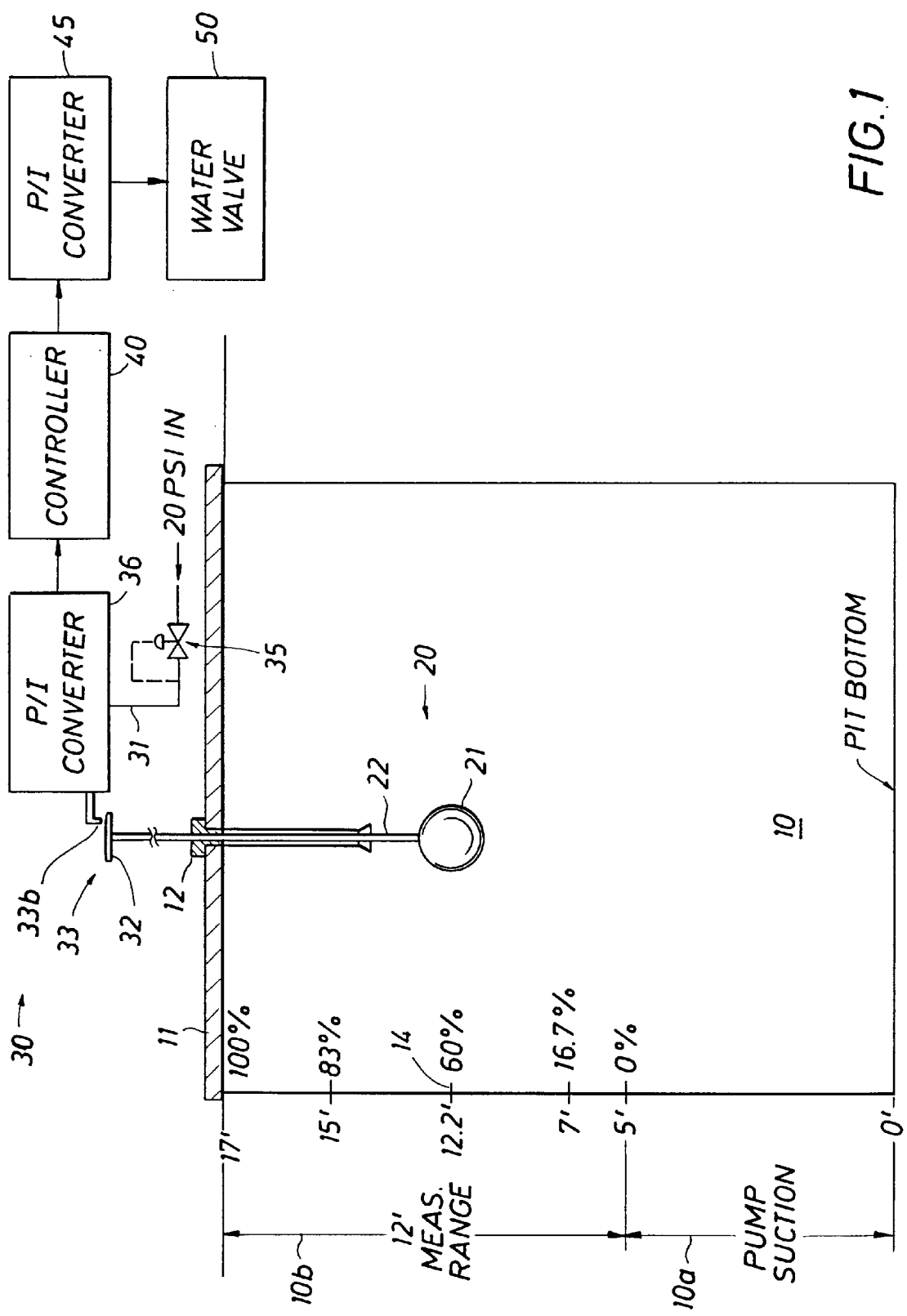
FIG. 1 is a schematic drawing of the invention as used in a brine pit.

A sump and system that makes good use of this low deadband switch and tight fluid level control is in the water treating area. Saturated brine solution is used to regenerate a water softener's zeolite bed. A water softener is a vessel that is used to remove calcium and magnesium from the water stream. The sump contains a saturated brine solution that is used to regenerate the zeolite catalyst in a soft water system. The sump, which operates unmixed/unagitated, typically contains far more salt than can be dissolved in the water contained in the sump. The process utilizes natural mixing, that is, a natural mixing occurs when salt is being absorbed by the water being introduced. The system relies on the natural solubility of salt in water for operation.

It is important that the salinity or concentration of salt in the water remains constant for good operation of the soft water system during the regenerating cycle. If the sump level gets too low, there may not be enough salt water for regeneration. If the water level gets too high, the system may not have time to naturally pull more salt off the bottom of the sump and into solution. Therefore it takes a bit of time for the unsaturated water to draw more salt out of solid form. A system for controlling fluid level to a very close tolerance is, therefore, needed.

For purposes of illustration, the example described with reference to FIG. 1 discloses a brine pit 10 which is seventeen feet deep and to which make-up water may be added. It will be appreciated that the level switch disclosed herein may be used in any size pit where any fluid level is to be controlled by the addition of any liquid. The drawing shows a pump section 10a that extends from the bottom of the pit (0') to the five-foot (5') level. The measurement range lob extends from the five foot level (0%) to the seventeen foot (17') level which corresponds (in this example) to the 100% (full) level and at which point a decking 11 is installed. For purposes of the example disclosed herein, the measurement range from the 5' to the 17' levels is further broken down into the following levels: (1) a seven foot (7') level corresponding to 16.7% of the measurement range (the level selected, in this example, as the low level alarm point); (2) a 12.2' level which corresponds to 60% of the measurement range (and which, as will be discussed below, is the set point level 14 selected for this example); and (3) a 15' level which corresponds to 83% of the measurement range and is selected (in this example) as the high level alarm point. In this example, high and low level alarms are installed but form no part of the invention.

Still referring to FIG. 1, the invention comprises three elements: (1) a float ball system 20 for tracking the fluid level in the sump 10; (2) a pneumatic level switch 30 which includes a nozzle/flapper assembly 33; and (3) a regulator 35 for supplying instrument air to the nozzle/flapper assembly 33 and to P/I converter 36 for use in controlling the fluid level in the pit 10. Float ball system 20 comprises a float ball 21 attached to a float rod 22, the latter extending through a flanged guide 12 in decking 11. A pneumatic level switch 30, comprising a nozzle/flapper assembly 33, is located at the upper end of rod 22 and is adapted to open and close with the rise and fall of the float system 20. A regulator 35 supplies instrument air to pneumatic switch 30 as will be subsequently described. A selected depth of brine pit 10 fluid level, e.g., sixty percent, may be calculated and is referred to herein as the set point setting 14. When the fluid level in pit 10 rises and contacts the float ball 21, the float ball 21 starts to rise with the fluid level, i.e., to track the changing fluid level in the pit 10. Nozzle/flapper assembly 33 forms a pneumatic switch which controls air flow therethrough, selectively blocking and permitting air flow with the rise and fall of the fluid level (thereby opening and closing the switch 30) as will be discussed below in detail. When the float ball 21 rises to the selected sixty percent (set point) level 14, the nozzle/flapper assembly 33, comprising a nozzle 33b and flapper rubber disc 32b, come together and form a seal thereby closing the nozzle/flapper assembly 33 of pneumatic level switch assembly 30. This results in a "high" pressure being applied to P/I converter 36 which, in turn, generates a signal to close a water make-up valve. As brine is consumed, the fluid level in pit 10 falls and float ball 21 falls below the selected sixty percent set point setting 14. Nozzle 33b and rubber disc 32b separate (thereby opening the switch 30), air pressure in pneumatic tubing 31 is dumped to the atmosphere and a low output pressure signal is supplied to the P/I converter 36 which, in response thereto, generates a signal to open a water make-up valve and add water the pit 10. Pneumatic power is supplied to the system by regulator 35 which supplies a constant 10.2 psi instrument air signal which is sent to the level switch assembly 30 and to P/I converter 36 through pneumatic tubing 31 as shown in FIG. 3A. If level switch assembly 30 is closed, no air escapes through the nozzle/flapper assembly 33 and the full 10.2 psi output of regulator 35 is transmitted to the P/I converter 36. In response, the P/I converter 36 generates a high (13.6 mA) output signal, which is used to close a water fill valve. If level switch assembly 30 is open, air is dumped to the atmosphere and there is no (or low) pressure to the P/I converter 36. In response, the P/I converter 36 generates a low (4 mA) output signal which is used to open a water fill valve and add water to the sump 10.

Referring now to FIG. 2, a sensor or float assembly 20, comprises a 7-inch stainless steel spherical float ball 21 mounted inside the salt water sump or brine pit 10. Attached to float ball 21, and used as the guide rod for the travel of float ball 21, is a piece of 0.500-inch stainless steel tubing or float rod 22, about 6–7 feet in length. Float rod 22 completely pierces the float ball 21, the entrance and exit holes in float ball 21 being sealed by neoprene gaskets 21a, 21b at the top and bottom respectively. Outside the brine pit 10 and above grade level decking 11, the float rod 22 rises straight up out of the brine pit 10 through a flanged guide 12 mounted on decking 11. Flanged guide 12 allows float rod 22 to pass through the decking 11 of brine pit 10 and keeps float rod 22 vertically aligned. On the upper end of the float rod 22 is mounted a flapper disc assembly 32 comprising a 2-inch stainless steel disk 32a with a 2-inch rubber disc 32b attached to the top of the stainless disk 32a (see FIGS. 3A and 3B for details). As the fluid level in the brine pit 10 rises, the float ball 21 rises with, or tracks, the fluid level and pushes the stainless steel float rod 22 straight upward through the small flanged guide 12. A reducer 23 is mounted to the underside of flanged guide 12 to prevent the float rod from galling. An adjustable down stop 25, prevents the float rod 22 and float ball 21 from traveling too far downward. Float ball 21 and float rod 22 not only rise and fall freely with the fluid level in pit 10, but they are also free to rotate with any forces imposed by the fluid.

Flapper disc assembly 32 is attached to float rod 22 at a point above the decking 11 of brine pit 10. When float ball 21 tracks the fluid level, it pushes the flapper disc assembly 32 up so as to contact and cover the nozzle 33b. As the fluid level falls, flapper disc assembly 32 falls and nozzle 33b and flapper rubber disc 32b no longer form a seal, so air pressure is dumped to the atmosphere through nozzle 33b. When running at the 60% set point setting 14, the rubber disc 32b covers and seals the nozzle 33b preventing the flow of air therethrough, thus no air is consumed. It is only when the fluid level deviation is low (i.e., below the selected set point level 14) that the nozzle/flapper seal is broken and air is dumped to the atmosphere. Corrective action is taken by adding enough water/brine to pit 10 in order for the float ball 21 to reach the 60% set point setting 14. At this point the nozzle/flapper forms a seal and the system, again, does not consume any air. Normally, the system does not consume any instrument air because the rubber disc 32b and nozzle 33b are together (forming a seal) and the full 10.2 psi output of regulator 35 (see FIG. 3A) is going to the P/I converter 36, therefore there is no leakage to atmosphere. The regulator 35 is adjusted so as to send a 10.2 psi output signal when the disc 32b covers the nozzle 33b and forms a seal. This 10.2 psi output corresponds to the selected level set point in a 3–15 psi signal range, i.e., 10.2 represents 60% of the 3–15 range. The signal minimum is 3 psi (0% level) and the signal maximum is 15 psi (100% level). The difference (15 psi–3 psi=12 psi) is the instrument span. The selected set point in this example is at the 60% level and is calculated as follows: (0.6×12)+3=10.2 psi output. The purpose of the P/I converter 36 is to receive the pneumatic output of regulator 35 and convert it to an electronic signal for use in controlling a valve 50 which supplies make-up water to the brine pit 10. The signal from the P/I converter 36 is relayed to a controller 40 for a signal range adjustment as is well known to those skilled in the art.

Referring now to FIGS. 3A and 3B, the pneumatic level switch assembly 30 will be discussed in detail. Suspended above the stainless steel and rubber flapper disk assembly 32, and separate from the sensor assembly 20, is mounted a length of 0.250-inch pneumatic tubing 31. A tubing fitting, or union, 33a is threaded into aluminum unistrut 34 and the other end attaches to tubing 31 which receives instrument air from regulator 35. Nozzle 33b is threaded into the underside of unistrut 34 and is in fluid communication with union 33a, the combination being in fluid communication with pneumatic tube 31. Instrument air, supplied by the regulator 35 through pneumatic tubing 31, discharges through the tubing fitting, or union, 33a and nozzle 33b downward towards the upward-facing rubber disc 32b on the flapper disc assembly 32. The nozzle 33b and disc 32a, combined, form the flapper/nozzle assembly 33. On the opposite end of the pneumatic tubing 31, a P/I converter 36 is piped up. The P/I Converter 36 converts the pneumatic signal in line 31 to an analog 4–20 mA electronic signal in order to communicate with a controller 40, such as a Moore 352. The output of controller 40 is fed to I/P converter 45 which generates a compatible pneumatic signal used for opening and closing the make-up water valve 50.

The controller 40 is tuned to open a water makeup valve 50 when its output is less that a 13.6 mA signal. The advantage of this switch is that it has an extremely low deadband. The brine level in brine pit 10 only has to drop less than 0.250-inch from the set point setting 14 before the rubber disc 32b pulls away from the nozzle 33b and breaks the seal. This exhausts the header enough to cause the P/I converter 36 to output a signal well below 13.6 mA which calls for make-up water to be added. Similarly, the brine level only has to rise back up this same amount to shut off the water flow to the brine pit 10. The result is an extremely tight control of the brine level in the brine pit 10. When the brine level is at or above the desired set point 14, the rubber disc 32b, mounted on top of the stainless steel disc 32a which is attached to float rod 22, makes a tight enough seal with the nozzle 33b that the pressure in that air header climbs toward 10.2 psi. So, the P/I converter 36 sees enough pressure to climb above about 13.6 mA keeping the fill water valve turned off. When the brine level drops, the rubber disc 32b is pulled away from the nozzle 33b, the air in pneumatic tube 31 vents to atmosphere and the header pressure drops toward 0 psi. So, the P/I converter 36 output drops to about 4 mA thereby generating a signal for opening the water valve and adding water to the pit 10.

The pneumatic, adjustable point contact level switch disclosed herein can adjust from a 0 to 100% level on an open pit by varying the length of the float rod 22. Switching occurs at whatever percentage is chosen for the particular application. When the level gets to the desired set point, the nozzle 33b and rubber disc 32b come together (form a seal) and water is turned off. An adjustable slider 36a allows one to pick any percentage of the open pit fluid level in the brine pit 10; i.e., any percentage of pit fluid level can be selected for switching to occur thereby setting the control level of brine in the brine pit 10.

The tubing fitting, or union 33a, fluidly connected to nozzle 33b, is a bulkhead union threaded to aluminum unistrut 34 above flapper disc assembly 32. The cap of union 33a has a hole drilled therein for fluid communication with nozzle 33b. The two pieces, tubing fitting (or union) 33a and nozzle 33b, make up the nozzle assembly 33. The two pieces, rubber disc 32b and stainless disc 32a make up the flapper assembly 32. The flapper disc assembly 32 comprises a stainless steel disc 32a and a rubber disc 32b which mates on top of the stainless disc 32a. Flat washers 38, 39 and bolt 37 hold the flapper 32 parts together. The stainless disc 32a and rubber disc 32b assembly screws into switch tubing 32c. Union 24 connects switch tubing 32c to float rod 22 and thence to float ball 21 as has been described above. Pneumatic tubing 31 supplies a 10.2 psi signal from regulator 35 to nozzle 33b (when sealed) and is equipped with a "T" 31a for simultaneously supplying the pressure therein to P/I converter 36. When the rubber disc 32b is against the nozzle 33b, no air is vented so the full 10.2 psi air pressure is applied to the P/I converter 36. When the rubber disc 32b is pulled away from the nozzle 33b, the air pressure dumps to atmosphere through the open nozzle 33b and air pressure to the P/I converter 36 is zero (or very low).

FIG. 3B is a top view of FIG. 3A. Flapper disc assembly 32 comprises rubber disc 32b mounted on top of stainless disc 32a and is fixedly attached to float rod 22. Float rod 22 is free to rotate, as well as to rise and fall, with float ball 21. Flapper disc assembly 32 is, therefore, free to spin 360 degrees with the float ball 21 and float rod 22. Nozzle 33b finds any place on the disc 32b where it can seat since rubber disc 32b covers the entire disc 32a and moves therewith. Float ball 21, as noted above, is free to rotate and to move up and down, therefore, the nozzle 33b will find any place on the rubber disc 32b where it can seat and form a seal.

In summary, if brine pit 10 is being depleted, float ball 21 will track the fluid level and will continue to fall until water is added or until adjustable down stop 25 hits the flanged guide 12 and stops. Before the set point setting 14 is reached, flapper disc assembly 32 and nozzle 33b are separated and do not form a seal, therefore instrument air in pneumatic line 31 and to P/I converter 36 is being vented to atmosphere through the open nozzle 33b. Since the level switch 30 is open and instrument air from regulator 35 is dumped to atmosphere, the P/I converter 36 generates a signal (less that 12 mA) to open a water valve and start filling the pit 10. As water is added, float ball 21 rises with (tracks) the brine level until the set point setting 14 is reached. When the brine level in the pit 10 reaches the set point setting 14, i.e., 60% of the measurement range (12.2'), the flapper disc assembly 32 contacts the nozzle 33b and makes a seal. Air pressure in line 31 can no longer vent to atmosphere and the full pressure is applied to the P/I converter 36. Pressure builds up to the P/I converter 36 and a 13.6 mA switching signal is generated by the converter. That switching signal from P/I converter 36 is used to close a water valve 50 thereby stopping the flow of water to brine pit 10. When the brine level in the pit 10 falls, flapper disc assembly 32 and nozzle 33b again separate, and air pressure to P/I converter 36 decreases because it is being vented to atmosphere through open nozzle 33b. Thus, when the fluid level is low, water is added to the pit. If the fluid level in the pit 10 is high, or reaches the set point 14, water is shut off.

Although the above description is directed to use of the invention to control the level of brine in a brine pit, the invention could be used to control the level of any fluid material in any open pit.

What is claimed is:

1. An apparatus for controlling the level of a fluid in a pit comprising:

a float means for tracking the level of said fluid in said pit, wherein said float means comprises a float ball attached to a float rod, said float ball adapted to rise and fall with the level of said fluid in said pit, and a flapper disc assembly fixedly attached to the upper end of said float rod thereby rising, falling and rotating with said float means, said upper end and said flapper disc assembly always remaining at an elevation higher than said pit and said fluid level;

means for determining when said fluid level reaches a selected set point level in said pit; and a pneumatic switch for signaling when said fluid rises to said selected set point level in said pit and when said fluid falls below said selected set point level in said pit, wherein said pneumatic switch comprises a nozzle for receiving and expelling a gas therethrough and sealing means on said flapper disc assembly for sealing said nozzle, thereby preventing the flow of gas therethrough, when said fluid level in said pit is at least as high as said selected set point level.

2. The system of claim 1 wherein said gas is supplied to said nozzle by a regulator.

3. The system of claim 2 wherein said regulator also supplies said gas to a pressure-to-current converter.

4. The system of claim 3 wherein said pressure-to-current converter is adapted to control a fluid valve in response to pressure supplied to said pressure-to-current converter by said regulator.

5. The system of claim 4 wherein said pressure-to-current converter supplies a signal which closes said fluid valve when said pressure-to-current converter output is high and supplies a signal which opens said fluid valve when said pressure-to-current converter output is low.

6. The system of claim 5 wherein said fluid valve is adapted to control the flow of said fluid into said pit.

* * * * *